Oct. 28, 1930.  G. J. HEIMBERGER  1,779,814
HEAT INSULATING CASING
Filed Dec. 6, 1928
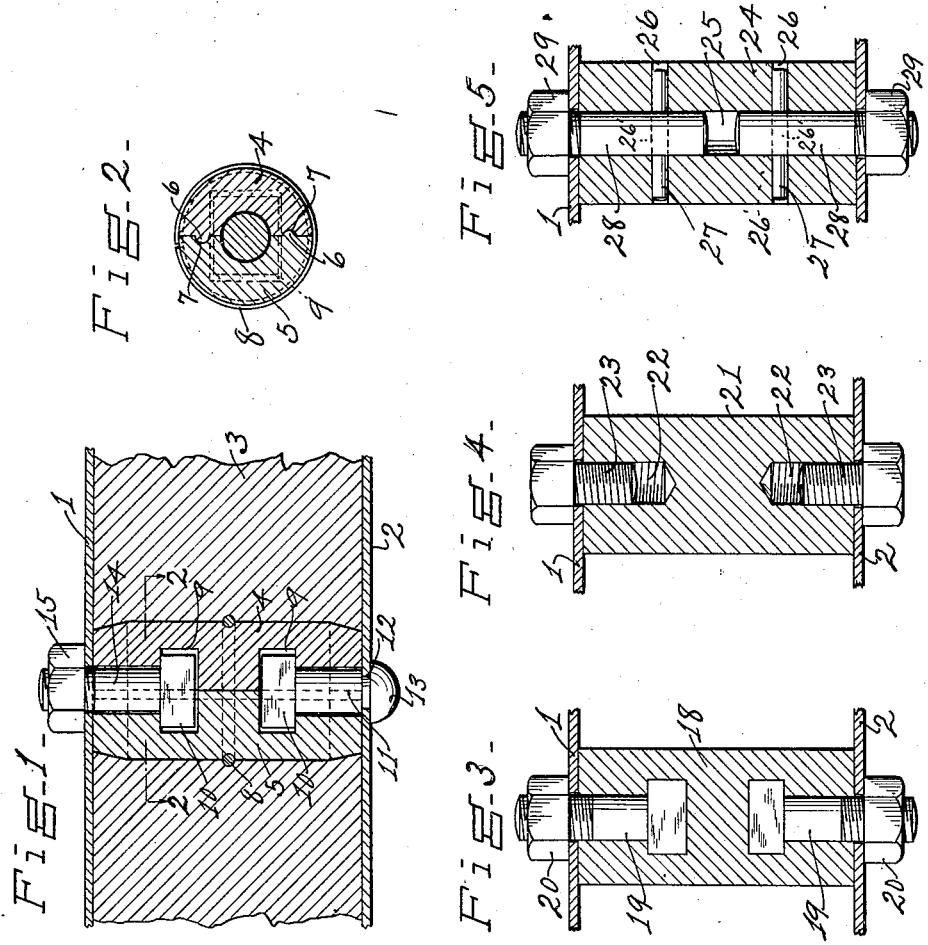
INVENTOR
George J. Heimberger
BY
Gifford & Sewel
ATTORNEYS.

Patented Oct. 28, 1930

1,779,814

UNITED STATES PATENT OFFICE

GEORGE J. HEIMBERGER, OF BAYONNE, NEW JERSEY, ASSIGNOR TO THE BABCOCK & WILCOX COMPANY, OF BAYONNE, NEW JERSEY, A CORPORATION OF NEW JERSEY

HEAT-INSULATING CASING

Application filed December 6, 1928. Serial No. 324,182.

This invention relates to a casing that may be made up in panels with metal plates spaced apart with heat insulating material between the same. The invention will be understood from the description in connection with the accompanying drawings in which Fig. 1 is a section partly broken away through an illustrative embodiment of the invention, Fig. 2 is a section along the line 2—2 of Fig. 1, and Figs. 3, 4 and 5 are longitudinal sections showing modifications of the spacing member.

In the drawings reference characters 1 and 2 indicate metal plates spaced apart with heating insulating material 3 between the plates.

The plates 1 and 2 are spaced apart by means of rigid spacers of considerable tensile strength that may be made up of two sections 4 and 5 to make a circular spacer. The contacting faces of the sections 4 and 5 may be provided with tongues 6 and grooves 7 into which the tongues fit. The sections may be provided with an annular groove into which a metallic ring 8 fits.

The two halves of the spacer are provided with recesses 9 spaced apart on opposite sides of its center to receive square heads 10 of bolts or the like. Each recess 9 in the spacers is rectangular in shape and engages the square head 10 of a bolt on two sides only, so that the tongue 6 at one half of the spacer engaging the groove 7 at the other half of the spacer maintains the two sections 4 and 5 in their relative position for preventing the bolt from turning. The other two sides of the bolt head have clearance in the spacer so that the bolt head will not tend to separate the two halves of the spacer when the spacer resists the turning of the bolt as the nut is screwed down. One of these bolts 11 is provided with a reduced portion 12 extending through the plate 2 and terminating in an expanded head 13 to keep the bolt in place. The other bolt 14 is provided with a screw threaded end that extends through the hole in plate 1 and a nut 15 is provided for tightening the bolt.

The spacer made up of the sections 4 and 5 may be made of different sorts of heat insulating material that possess the requisite strength. For example, the spacer may be made of a molded and fired ceramic body similar to porcelain that is used for electric insulation purposes.

Since the square ends of the bolts 10 do not touch each other, but are separated by heat insulating material, heat will not be readily transmitted from one of the metal plates to the other. At the same time, the spacers possess sufficient tensile and compressive strength so that the plates 1 and 2 can be secured together firmly and retain the heat insulating material 3 between them.

Different modifications of the spacers are shown in Figs. 3, 4 and 5. In Fig. 3 the spacer 18 is shown as being made up of porcelain that was molded around the headed ends of the bolts 19 that have screw threaded portions extending through the plates 1 and 2 with nuts 20 for tightening the same.

In Fig. 4 the spacer 21 is shown as being provided with threaded holes 22 extending into the opposite ends thereof to accommodate threaded bolts 23 that pass through holes in the plates 1 and 2 and are screwed into the threaded holes 22 for tightening the plates.

In the modification shown in Fig. 5, the spacer 24 is shown with a hole 25 extending longitudinally through the center thereof and with transverse holes 26 spaced upon opposite sides of the center. Transverse pins 27 extend through the holes 26 and there are corresponding holes 26' in the shanks of the bolts 28 which have threaded extensions projecting through the plates 1 and 2 with nuts 29 for tightening the same.

I claim:

1. A heat insulating casing comprising spaced metal plates, distance pieces between said plates made of stress transmitting heat insulating material and elongated metallic members connecting said plates and distance pieces and separated from each other longitudinally.

2. A heat insulating casing comprising spaced metal plates, distance pieces between said plates made of stress transmitting heat insulating material, elongated metallic members connecting said plates and distance pieces and separated from each other longitudinally, and means to tighten said members.

3. A heat insulating casing comprising spaced metal plates, distance pieces between said plates made of stress transmitting heat insulating material, metallic members connecting said plates and distance pieces and separated from each other, and nuts to tighten said members.

4. A heat insulating casing comprising spaced metal plates, distance pieces between said plates made of rigid heat insulating material and metallic members anchored to said distance pieces and connected to said plates.

5. A heat insulating casing comprising spaced metal plates, elongated separators of heat insulating material between said plates, and bolts extending through said plates and longitudinally of said separators and terminating short of each other.

6. A heat insulating casing comprising spaced metal plates, elongated separators of heat insulating material between said plates, and bolts extending through said plates and longitudinally of said separators and anchored on opposite sides of the centers of said separators.

7. A heat insulating casing comprising spaced metal plates, separators of heat insulating material between said plates, and aligned bolts extending through said plates into said separators.

8. A heat insulating casing comprising spaced metal plates, separators of heat insulating material between said plates, aligned bolts extending through said plates into said separators, and means to tighten said bolts.

GEORGE J. HEIMBERGER.